US007743172B2

United States Patent
Chauve et al.

(10) Patent No.: US 7,743,172 B2
(45) Date of Patent: Jun. 22, 2010

(54) DIE-TO-DIE INTERCONNECT INTERFACE AND PROTOCOL FOR STACKED SEMICONDUCTOR DIES

(75) Inventors: Nicolas Chauve, Mougins (FR); Tarek Zghal, San Diego, CA (US); Maxime Leclercq, Del Mar, CA (US)

(73) Assignee: Texas Instruments Incorporated, Dallas, TX (US)

( * ) Notice: Subject to any disclaimer, the term of this patent is extended or adjusted under 35 U.S.C. 154(b) by 366 days.

(21) Appl. No.: 11/272,615

(22) Filed: Nov. 14, 2005

(65) Prior Publication Data

US 2006/0190691 A1 Aug. 24, 2006

(30) Foreign Application Priority Data

Feb. 3, 2005 (EP) ................... 05290245

(51) Int. Cl.
*G06F 3/00* (2006.01)
(52) U.S. Cl. ........................................... 710/6; 710/18
(58) Field of Classification Search ...................... 710/6
See application file for complete search history.

(56) References Cited

U.S. PATENT DOCUMENTS 5,212,373 A 5/1993 Fujioka et al.
6,121,814 A * 9/2000 Henry .......................... 327/291
6,304,923 B1 * 10/2001 Klein .......................... 710/41
6,480,131 B1 * 11/2002 Roper et al. .................. 341/155
6,851,009 B1 * 2/2005 Regula ........................ 710/305
7,296,124 B1 * 11/2007 Falik .......................... 711/157
2002/0121679 A1 * 9/2002 Bazarjani et al. ............. 257/666
2004/0230850 A1 * 11/2004 Baumgartner et al. ........ 713/320

FOREIGN PATENT DOCUMENTS

EP 0 490 573 A 6/1992

* cited by examiner

*Primary Examiner*—Niketa I Patel
*Assistant Examiner*—Zachary K Huson
(74) *Attorney, Agent, or Firm*—Ronald O. Neerings; Wade James Brady, III; Frederick J. Telecky, Jr.

(57) ABSTRACT

A system and method for a die-to-die interconnect interface and protocol for stacked semiconductor dies. One preferred embodiment comprises an integrated circuit (IC) package comprising a first semiconductor die that includes an interface to a memory-mapped device, a second semiconductor die that does not include an interface to a memory mapped device, and a data bus coupling the first semiconductor die to the second semiconductor die (the data bus used to transfer a control word and a data word). The control word comprises a data word start address that corresponds to a location in the memory-mapped device. The data word is transferred from the second semiconductor die to the first semiconductor die and is stored by the first semiconductor die at the location in the memory-mapped device. Both semiconductor dies are mounted within the IC package.

17 Claims, 3 Drawing Sheets

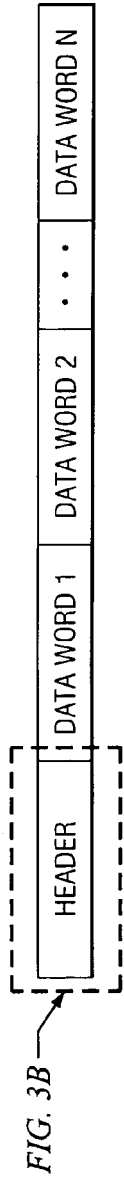
FIG. 3A
FIG. 3B
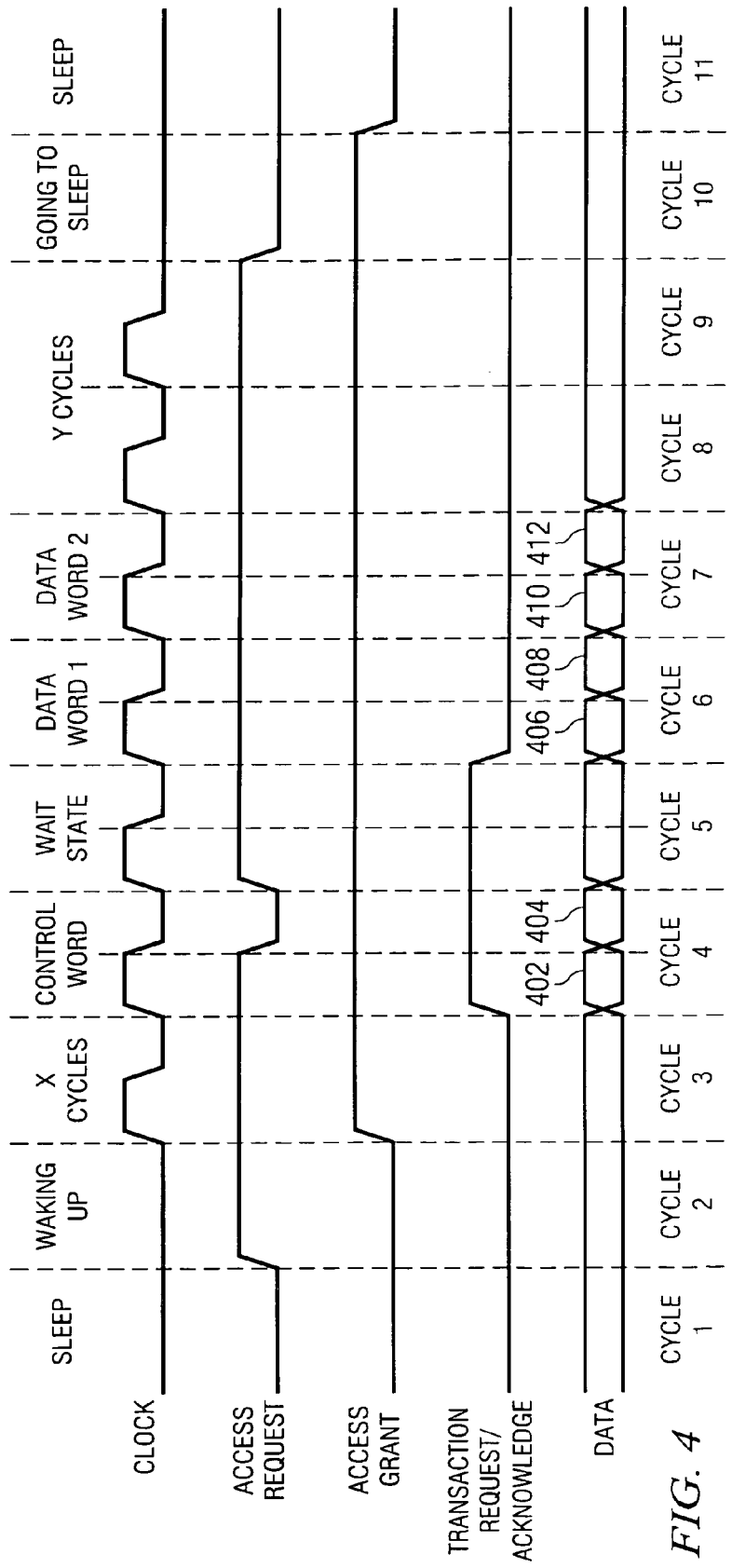
FIG. 4

DIE-TO-DIE INTERCONNECT INTERFACE AND PROTOCOL FOR STACKED SEMICONDUCTOR DIES

BACKGROUND

1. Technical Field

The present subject matter relates generally to integrated circuits (ICs). More particularly, the present subject matter relates to an interconnect protocol for use in an IC package comprising at least two stacked dies.

2. Background Information

In some applications, it is desirable to include more than one semiconductor die in a single semiconductor package. For example, two dies can be stacked in a single package. As such, one die resides on top of another die. One or more issues arise regarding the interconnection protocol between stacked dies. If the dies have different "footprints" (i.e., are of different sizes), electrically interconnecting the dies may be problematic. In general, the electrical connectivity to/from a die is generally from "pins" formed or attached to the sides of the die. If the die has four sides (most dies are rectangular and thus have four sides), then all four sides of the die may be used for interconnection pins. Pins of one die can be connected to a corresponding pin of another die if the sides of the dies align vertically. For example, if two stacked dies have the same footprint, then the four sides of the dies are in vertical align and the pins on all four sides of each die can be connected with pins of the other die. However, if the dies have different footprints, then, in general, the dies can be stacked only in such a way that one or two sides (not all four) of the dies vertically align. In this case, only the one or two aligned sides can be used for die-to-die interconnection pins. As a result, fewer pins are available to interconnect stacked dies of different sizes than stacked dies of the same size.

Despite different size stacked dies being inter-connectable with fewer pins than same size stacked dies, it still may be desirable for the smaller die to have shared access to resources coupled to the larger die. These resources may have a large number of signals, well in excess of the number of interconnect pins available to the smaller die. Further, it may be desirable to share such resources without causing substantially higher power consumption of the system despite the desire for higher performance and lower latency in the face of fewer interconnecting pins.

SUMMARY

The problems noted above are addressed in large part by a system and method for a die-to-die interconnect interface and protocol for stacked semiconductor dies. One preferred embodiment comprises an integrated circuit (IC) package comprising a first semiconductor die that includes an interface to a memory-mapped device, a second semiconductor die that does not include an interface to the memory mapped device, and a data bus coupling the first semiconductor die to the second semiconductor die (the data bus used to transfer a control word and a data word). The control word comprises a data word start address that corresponds to a location in the memory-mapped device. The data word is transferred from the second semiconductor die to the first semiconductor die and is stored by the first semiconductor die at the location in the memory-mapped device. Both semiconductor dies are mounted within the IC package.

Another preferred embodiment comprises an IC package comprising a first semiconductor die that includes an interface to a memory-mapped device, a second semiconductor die that does not include an interface to the memory-mapped device, and a data bus coupling the first semiconductor die to the second semiconductor die (the data bus used to transfer a control word and a data word). The control word comprises a data word start address that corresponds to a location in the memory-mapped device. The data word is read from the location in the memory-mapped device by the first semiconductor die and is transferred from the first semiconductor die to the second semiconductor die. Both semiconductor dies are mounted within the IC package.

Yet another preferred embodiment comprises a method used in an IC package comprising a first semiconductor die and a second semiconductor die (the first semiconductor die coupled to a memory-mapped device). The method comprises the second semiconductor die issuing a request to the first semiconductor die for access to the memory-mapped device, the first semiconductor die responding with an acknowledgement to the second semiconductor's access request, the second semiconductor die transferring a header to the first semiconductor die, the second semiconductor die transferring data to the first semiconductor die after transferring the header, and the first semiconductor die storing the data at the destination location. The header transferred to the first semiconductor die comprises an address of a destination location in the memory-mapped device.

Still another preferred embodiment comprises a method used in an IC package comprising a first semiconductor die and a second semiconductor die (the first semiconductor die coupled to a memory-mapped device). The method comprises the second semiconductor die issuing a request to the first semiconductor die for access to the memory-mapped device, the first semiconductor die responding with an acknowledgement to the second semiconductor's access request, the second semiconductor die transferring a header to the first semiconductor die, the first semiconductor die reading data from the source location after transferring the header, and the first semiconductor die transferring the data to the second semiconductor die. The header transferred to the first semiconductor die comprises an address of a source location in the memory-mapped device.

BRIEF DESCRIPTION OF THE DRAWINGS

For a detailed description of the preferred embodiments of the invention, reference will now be made to the accompanying drawings in which:

FIG. 3A shows a transaction protocol message in accordance with the at least some of the preferred embodiments;

FIG. 4 shows a timing diagram illustrating a transaction between two stacked semiconductor dies in accordance with at least some of the preferred embodiments.

NOTATION AND NOMENCLATURE

Certain terms are used throughout the following discussion and claims to refer to particular system components. This document does not intend to distinguish between components that differ in name but not function.

In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more parts and may be used to refer to a computer system or a portion of a computer system.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
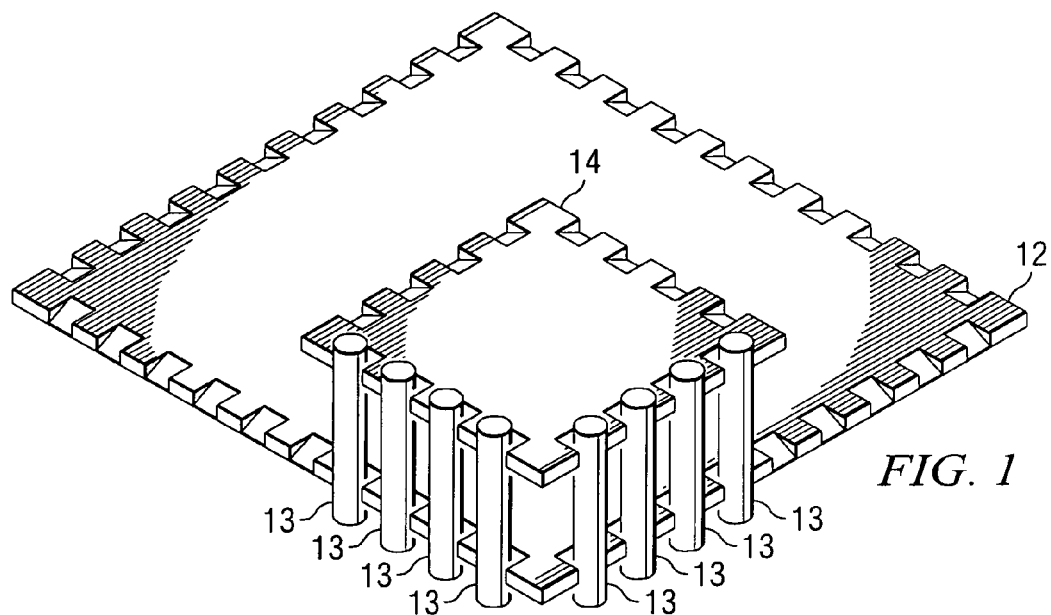
FIG. 1 shows a die stack, one die in the stack having a smaller footprint than the other die in the stack.

FIG. 1 illustrates two dies in what is sometimes referred to as a "stacked" configuration within an integrated circuit (IC) package. In the example shown one semiconductor die 14, which may comprise a modem, is positioned on top of another larger semiconductor die 12, which may comprise an application engine. The dies 12 and 14 are stacked within a common IC package. The interconnect pins 13 connecting the two semiconductor dies are limited to the two sides that coincide, and to the number of connection points available on each of the two coinciding sides of the smaller modem 14. The limited number of common connection points may make sharing an external interface to other system components difficult. For example, if the application engine 12 couples to a memory device, it may not be possible for the modem 14 to share the interface to the memory by interconnecting the two dies, since memory interfaces frequently have large numbers of signals. The large number of signals may exceed the number of connection points available on the smaller modem 14. This problem may be avoided by using a small (i.e., with relatively few pins), simple, dedicated interface between the modem 14 and the application engine 12, wherein the application engine 12 acts as an intermediary between the modem 14 and other devices with larger and more complex interfaces.

Figure 2:
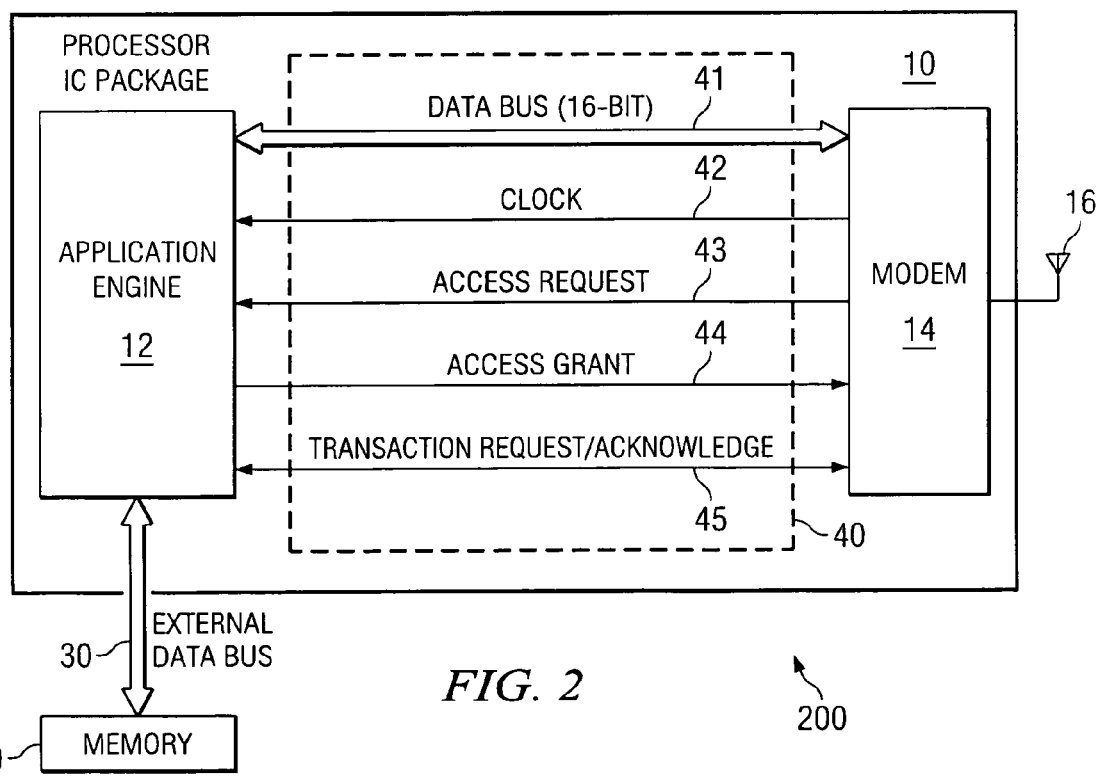
FIG. 2 shows a system that comprises a die stack having shared access to memory in accordance with at least some of the preferred embodiments.

FIG. 2 illustrates a communication system 200 comprising an IC package with stacked dies constructed in accordance with at least some of the preferred embodiments. In the example shown, processor IC package 10 comprises application engine 12 and modem 14 which are stacked within the processor IC package and coupled to each other via interface 40. The interface 40 comprises a bidirectional data bus 41 (comprising 16 data bits in the preferred embodiment shown), a clock signal 42, an access request signal 43, an access grant signal 44, and a bidirectional transaction request/acknowledge signal 45. The example shown also illustrates an external (external to IC package 10) memory 20 coupled to application engine 12 via external bus 30, and a radio frequency (RF) transceiver antenna 16 coupled to modem 14. The external bus 30 may be used to transfer data between application engine 12 and memory 20. The antenna 16 may be used by the modem 14 to transfer data (via RF signals) to and from other external data and communications systems (not shown). The modem 14 does not have an interface that it can use to directly access the memory 20, nor does it have the capability to couple to the memory 20 via the external bus 30.

Figure 3B:
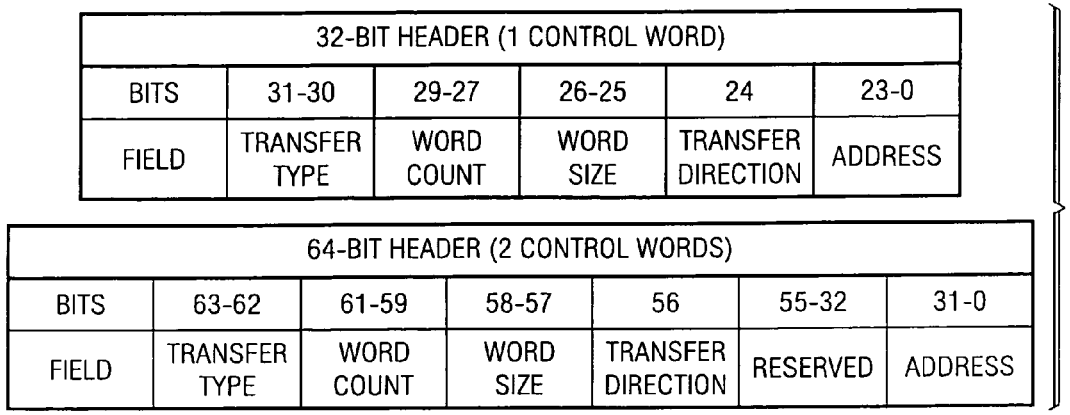
FIG. 3B shows individual fields for both a 32-bit and a 64-bit header of a transaction protocol message in accordance with at least some of the preferred embodiments.

The data bus 41 of the preferred embodiment illustrated may be used to transfer both control information and data between the two dies. This may be accomplished through the use of a transaction protocol, which defines a message structure for each transaction between the two semiconductor dies. FIG. 3A illustrates the structure of a transaction message, in accordance with at least some preferred embodiments. The message comprises a header and one or more data words, one word comprising 32 bits. FIG. 3B illustrates an example of a message header comprising one control word, as well as a message header comprising two control words. The one-word message header is 32 bits in size, comprises a 24-bit address field, and may be transferred as part of a transaction in one clock cycle. The two-word message header is 64 bits in size, comprises a 32-bit address field, and may be transferred as part of a transaction in two clock cycles. The message header may also comprise other information controlling the transfer of the data words. As shown in FIG. 3B, such information may include the transfer type (e.g., normal, locked, or wrapped), the data word count, the data word size, and the transfer direction.

Referring again to FIG. 2, transfers of a word across the 16-bit data bus 41 may be accomplished by transferring one half of the word on the leading edge of the clock 42, and then transferring the other half of the word on the falling edge of the clock 42. In this manner more data may be transferred per clock cycle, thus increasing the data throughput of the interface 40. FIG. 4 illustrates a data read cycle, where the data to be read by the modem 14 is stored in the memory 20. The cycle shown begins with the interface 40 in a sleep state (cycle 1), wherein the clock 42 is inactive and no transactions are taking place. This sleep or power conservation state is used to reduce the power consumption of the system when data transfers between the two dies are not taking place. The modem 14 initiates a wakeup sequence (cycle 2) by activating the access request 43 to request access to the resource accessible by the application engine 12. In the preferred embodiment shown memory 20 is the resource accessible by the application engine 12 and shared with the modem 14 using the transaction protocol. The application engine 12 responds to the request for access (cycle 3) by activating the access grant 44 when the memory 20 becomes available to the application engine 12.

The modem 14 activates the clock 42 for a predetermined number of cycles (shown as X cycles in FIG. 4), after which the transaction request/acknowledge 45 is activated by the modem 14 to begin a transaction (cycle 4). The information present on the data bus 41 on the rising edge of the clock 42 during cycle 4 is the first half 402 of the control word. The second half 404 of the control word is presented on the data bus 41 on the falling edge of the clock 42 during cycle 4. In the example shown a single 32-bit control word is used and the transfer of the control word is complete after 1 cycle. When the last half of the last control word (i.e., the second half 404 of the control word in the example in FIG. 4) is presented on the data bus 41, the access request 43 is deasserted for the duration of the remainder of the cycle (i.e., cycle 4 in the example shown). The deassertion of the access request 43 signals the completion of the transfer of the message header.

During the read cycle illustrated in FIG. 4, both the data bus 41 and the transaction request/acknowledge 45 transition from being driven by the modem 14 to being driven by the application engine 12. These signals are shared to further improve the efficiency of the interface by not requiring two separate sets of signals and data busses. The transition may take place after the header has been transferred. In order to reduce the amount of power used and the amount of noise generated by the transition, the application engine 12 may initially drive the last value of the signal driven by the modem 14 for a clock cycle (e.g., during the wait state of cycle 5) before transitioning to the value presented by the application engine 12 (e.g., the data value read from memory presented on the data bus 41). Thus, if the disabling of the driver on the modem 14 overlaps with the enabling of the driver on the application engine 12, the adverse effects of the resulting driver contention will be significantly reduced. Additional restrictions on the timing of the enabling and disabling of the drivers may also be implemented to avoid or reduce the driver contention. It should be noted that there is no need to transition signals during a data write to the memory 20 since both the data bus 41 and the transaction request/acknowledge 45 are both driven by the modem 14 throughout the entire transaction.

After the header has been transferred to the application engine 12 there may be a delay due to the time required by the application engine to interpret the header and access the first data word in the memory 20. This delay is shown in FIG. 4 as a wait state in cycle 5. Once the application engine has retrieved the first data word (based on the information provided in the header word) data transfers may begin between the application engine 12 and the modem 14. As illustrated, data word 1 is transferred during cycle 6. The first half 406 of data word 1 is transferred on the rising edge of the clock 42 during cycle 6, and the second half 408 of data word 1 is transferred on the falling edge of the clock 42 during cycle 6. Likewise, data word 2 is transferred during cycle 7, with the first half 410 of data word 2 transferred on the rising edge of the clock 42 and the second half 412 of data word 2 transferred on the falling edge of the clock 42.

It may be possible to transfer additional data words up to a maximum number of words determined by the word count field of the header. Thus, for example, if a header is structure like the examples shown in FIG. 3B with a three-bit word count field, a maximum of eight data words may be transferred during each transaction. This helps to reduce the latency introduced by the overhead of a transaction, since only one header is required for each transaction. The larger the number of data words per transaction, the lower the overall latency imposed by the protocol on data exchanges.

Once the data words have been transferred the transaction is complete. Additional transactions may follow (beginning with another assertion of the transaction request/acknowledge 45), or the interface may return to a sleep state if no activity takes place within a predetermined period of time. The latter case is shown in FIG. 4 as Y cycles of idle time in cycles 8 and 9. When the interface has been idle for at least Y cycles, the modem 14 deactivates the clock 41 and deasserts the access request 42 (cycle 10) to initiate the process of placing the interface into a sleep or power conservation mode. In response to the deassertion of the access request 41 the application engine deasserts the access grant (cycle 11), which completes the switch into the sleep mode.

Figure 5:
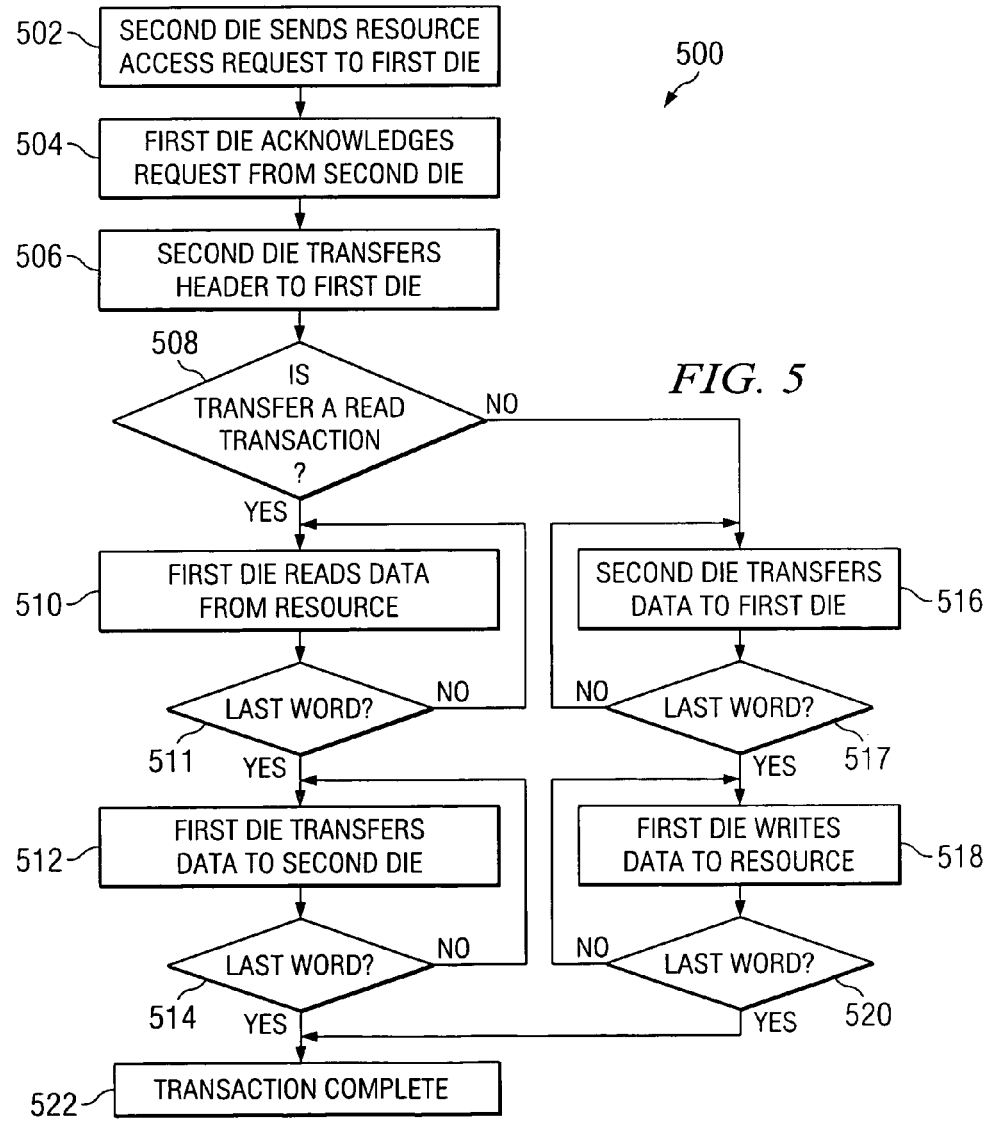
FIG. 5 illustrates a method for implementing a transaction message protocol in accordance with at least some embodiments.

FIG. 5 illustrates a method 500 for transferring data between two semiconductor dies within a single IC package using a transaction message protocol, in accordance with at least some preferred embodiments. A transaction begins in block 502 with a resource access request from a second semiconductor die (e.g., modem 14) to a first semiconductor die (e.g., application engine 12). The first semiconductor die has access to the requested resource, which may be any memory-mapped resource within the communications system 200 (e.g., memories, direct memory access controllers, graphics adapters, and network adapters). The request is acknowledged in block 504 by the first semiconductor die.

After the request has been acknowledged the second semiconductor die sends a header to the first semiconductor die, as shown in block 506, which contains information necessary to access the memory mapped resource and transfer the requested data a manner specified in the header. The header is tested in block 508 to determine if the access to the requested resource is a read or a write access. Thus, for example, a 32-bit header may be sent to the first semiconductor die that specifies a data read of 4, 16-bit data words from a memory (e.g., memory 20) starting at hexadecimal address 40000. This would result in a data read by the first semiconductor die from the resource as shown in block 510. If the number of data words read is not found in block 511 to be equal to the number of data words requested (4 in the example described), block 510 is repeated until the number of data words read is equal to the number of data words requested. Once the requested data words are read, a data word is transferred from the first semiconductor die to the second semiconductor die as shown in block 512. If the number of data words transferred is not found in block 514 to be equal to the number of data words requested (4 in the example described), block 512 is repeated until the number of data words transferred is equal to the number of data words requested. After the last data word is transferred the transaction is complete as shown in block 522.

If the test of the header in block 508 results in a determination that the access to the requested resource is a write access, the second semiconductor die transfers a data word to the first semiconductor die as shown in block 516. If the number of data words transferred is not found in block 517 to be equal to the number of data words to be written, block 516 is repeated until the number of data words transferred is equal to the number of data words to be written. Once the data words to be written are transferred, a data word is written to the resource as shown in block 518. If the number of data words written is not found in block 520 to be equal to the number of data words to be written, block 518 is repeated until the number of data words written is equal to the number of data words to be written. After the last data word is written the transaction is complete as shown in block 522.

It is noted that although the preferred embodiments described illustrate examples wherein the protocol is used to facilitate the sharing of resources coupled to the first semiconductor die, the protocol may also be used to exchange data directly between the two semiconductor dies. The savings in power, increased efficiency, and low latency advantages of the protocol are equally realized by such an embodiment of the protocol, and may also be realized in other embodiments not expressly described but apparent to those skilled in the art.

It is also noted that although the embodiments described utilize an application engine and a modem, these are only two of a variety of semiconductor dies (e.g., graphics display processors, network interfaces, and digital signal processors) that may be included in a stacked package configuration. It is intended that all such variations of semiconductor dies be within the scope of the disclosure. It is further noted that although the embodiments described illustrate a first semiconductor die (application engine 12) sharing resources with a second semiconductor die (modem 14), embodiments configured such that the second die shares resources with the first die are also intended to be within the scope of the disclosure.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An integrated circuit (IC) package, comprising:
a first semiconductor die mounted within the IC package and including an interface for interfacing with a memory-mapped device that is physically external to the IC package;
a plurality of physical connection points coupled to said interface and physically accessible externally of the IC package, said physical connection points adapted to be coupled to the memory mapped device;
a second semiconductor die not comprising an interface to the memory-mapped device, the second semiconductor die also mounted within the IC package; and
a data bus coupling the first semiconductor die to the second semiconductor die, the data bus used to transfer a control word and a data word;
wherein the control word comprises a data word start address that corresponds to a location in the memory-mapped device, the data word transferred from the second semiconductor die to the first semiconductor die and stored by the interface at the location in the memory-mapped device when the memory-mapped device is coupled to said physical connection points.

2. The IC package of claim 1, wherein a first portion of the control word is transferred at a rising edge of the clock signal, and a second portion of the control word is transferred at a falling edge of the clock signal.

3. The IC package of claim 1, wherein a first portion of the data word is transferred at a rising edge of the clock signal, and a second portion of the data word is transferred at a falling edge of the clock signal.

4. The IC package of claim 1, wherein the control word further comprises at least one field selected from the group consisting of a data word transfer type field, a data word count field, a data word size field, and a data word transfer direction field.

5. The IC package of claim 1, further comprising:
a clock signal coupling the first semiconductor die to the second semiconductor die, the clock signal used to synchronize transfers of the control word and the data word;
wherein the clock signal is activated for a predetermined startup time before beginning the transfers of the control word and the data word on the data bus; and
wherein the clock signal is deactivated when there are no transfers of the control word and the data word on the data bus after a predetermined idle time.

6. The IC package of claim 1,
wherein the first semiconductor die drives a value on the data bus at the start of a transitional period and does not drive the value on the data bus at the end of the transitional period; and
wherein the second semiconductor die does not drive the value on the data bus at the start of the transitional period and does drive the value on the data bus at the end of the transitional period.

7. The IC package of claim 1,
wherein the second semiconductor die drives a value on the data bus at the start of a transitional period and does not drive the value on the data bus at the end of the transitional period; and
wherein the first semiconductor die does not drive the value on the data bus at the start of the transitional period and does drive the value on the data bus at the end of the transitional period.

8. An integrated circuit (IC) package, comprising:
a first semiconductor die mounted within the IC package and including an interface for interfacing with a memory-mapped device that is physically external to the IC package;
a plurality of physical connection points coupled to said interface and physically accessible externally of the IC package, said physical connection points adapted to be coupled to the memory mapped device;
a second semiconductor die not comprising an interface to the memory-mapped device, the second semiconductor die also mounted within the IC package; and
a data bus coupling the first semiconductor die to the second semiconductor die, the data bus used to transfer a control word and a data word;
wherein the control word comprises a data word start address that corresponds to a location in the memory-mapped device, and wherein, when the memory-mapped device is coupled to said physical connection points, the data word is read from the location in the memory-mapped device by the interface and transferred from the first semiconductor die to the second semiconductor die.

9. The IC package of claim 8, wherein a first portion of the control word is transferred at a rising edge of the clock signal, and a second portion of the control word is transferred at a falling edge of the clock signal.

10. The IC package of claim 8, wherein a first portion of the data word is transferred at a rising edge of the clock signal, and a second portion of the data word is transferred at a falling edge of the clock signal.

11. The IC package of claim 8, wherein the control word further comprises at least one field selected from the group consisting of a data word transfer type field, a data word count field, a data word size field, and a data word transfer direction field.

12. The IC package of claim 8, further comprising:
a clock signal coupling the first semiconductor die to the second semiconductor die, the clock signal used to synchronize transfers of the control word and the data word;
wherein the clock signal is activated for a predetermined startup time before beginning the transfers of the control word and the data word on the data bus; and
wherein the clock signal is deactivated when there are no transfers of the control word and the data word on the data bus after a predetermined idle time.

13. The IC package of claim 8
wherein the first semiconductor die drives a value on the data bus at the start of a transitional period and does not drive the value on the data bus at the end of the transitional period; and
wherein the second semiconductor die does not drive the value on the data bus at the start of the transitional period and does drive the value on the data bus at the end of the transitional period.

14. The IC package of claim 8,
wherein the second semiconductor die drives a value on the data bus at the start of a transitional period and does not drive the value on the data bus at the end of the transitional period; and
wherein the first semiconductor die does not drive the value on the data bus at the start of the transitional period and does drive the value on the data bus at the end of the transitional period.

15. A method used in an integrated circuit package comprising a first semiconductor die and a second semiconductor die, the first semiconductor die coupled to a memory-mapped device that is physically external to the integrated circuit package by a plurality of physical connection points of the integrated circuit package that are physically accessible externally of the integrated circuit package, comprising:

the second semiconductor die issuing a request to the first semiconductor die for access to the memory-mapped device;

the first semiconductor die responding with an acknowledgement to the second semiconductor's access request;

the second semiconductor die transferring a header to the first semiconductor die, the header comprising an address of a destination location in the memory-mapped device;

the second semiconductor die transferring data to the first semiconductor die after transferring the header; and the first semiconductor die storing the data at the destination location;

wherein the header further comprises at least one field selected from the group consisting of a data word size field and a data word transfer direction field.

16. A method used in an integrated circuit package comprising a first semiconductor die and a second semiconductor die, the first semiconductor die coupled to a memory-mapped device that is physically external to the integrated circuit package by a plurality of physical connection points of the integrated circuit package that are physically accessible externally of the integrated circuit package, comprising:

the second semiconductor die issuing a request to the first semiconductor die for access to the memory-mapped device;

the first semiconductor die responding with an acknowledgement to the second semiconductor's access request;

the second semiconductor die transferring a header to the first semiconductor die, the header comprising an address of a source location in the memory-mapped device;

the first semiconductor die reading data from the source location after transferring the header;

the first semiconductor die transferring the data to the second semiconductor die; and the second semiconductor die wirelessly transmitting said data to a device external to the integrated circuit package.

17. The method claim 16, wherein the header further comprises at least one field selected from the group consisting of a data word transfer type field, a data word count field, a data word size field, and a data word transfer direction field.

* * * * *